(12) United States Patent
Evans et al.

(10) Patent No.: US 11,434,865 B2
(45) Date of Patent: *Sep. 6, 2022

(54) SYSTEMS AND METHODS FOR ELECTRICAL POWER GENERATION

(71) Applicants: Robert J Evans, Scottsdale, AZ (US); Lisa Marie Evans, Scottsdale, AZ (US)

(72) Inventors: Robert J Evans, Scottsdale, AZ (US); Lisa Marie Evans, Scottsdale, AZ (US); Joseph Pepe Elijio Velasquez, Tempe, AZ (US); Joseph M Barrett, Tempe, AZ (US)

(73) Assignees: Robert J. Evans, Scottsdale, AZ (US); Lisa Marie Evans, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/346,219

(22) Filed: Jun. 12, 2021

(65) Prior Publication Data
US 2022/0034290 A1    Feb. 3, 2022

Related U.S. Application Data

(63) Continuation-in-part of application No. 16/945,784, filed on Jul. 31, 2020, now Pat. No. 11,060,499.

(51) Int. Cl.
  *F03B 17/02* (2006.01)
  *F03B 13/08* (2006.01)
  *H02K 7/18* (2006.01)

(52) U.S. Cl.
  CPC .............. *F03B 17/02* (2013.01); *F03B 13/08* (2013.01); *H02K 7/1853* (2013.01)

(58) Field of Classification Search
  CPC ........ F03B 17/02; F03B 13/08; H02K 7/1853
  See application file for complete search history.

(56) References Cited

U.S. PATENT DOCUMENTS

| 2008/0085158 | A1  | 4/2008  | Henderson |
| 2012/0013131 | A1  | 1/2012  | Yeh |
| 2017/0321651 | A1* | 11/2017 | Westmoreland ...... F03B 17/005 |
| 2019/0203690 | A1  | 7/2019  | Townsend |

FOREIGN PATENT DOCUMENTS

| BE | 1016363     | 9/2006  |
| CN | 101539092   | 9/2009  |
| DE | 202018005684| 4/2019  |
| KR | 20010112206 | 12/2001 |
| WO | 2003069755  | 8/2003  |
| WO | 2011010945  | 1/2011  |

\* cited by examiner

*Primary Examiner* — Viet P Nguyen
(74) *Attorney, Agent, or Firm* — Michelle L. Gross, P.C.

(57) ABSTRACT

An electrical power generation system comprising a tube comprising a plurality of upper curves and a plurality of lower curves and forming a loop, the upper curves located at a higher vertical height than the lower curves and a plurality of electric generators external to the tube, each electric generator comprising a generator wheel having a magnet thereon, the plurality of electric generators positioned proximal to an external wall of the tube and electrically connected to a power grid. A plurality of buoyant torpedoes comprising a magnet travels through the tube and turns the wheel of the electric generator in response to the magnetic interaction between the magnet on the torpedo and the magnet on the generator wheel. At least a portion of the plurality of lower curves of the tube may comprise a check valve.

20 Claims, 13 Drawing Sheets

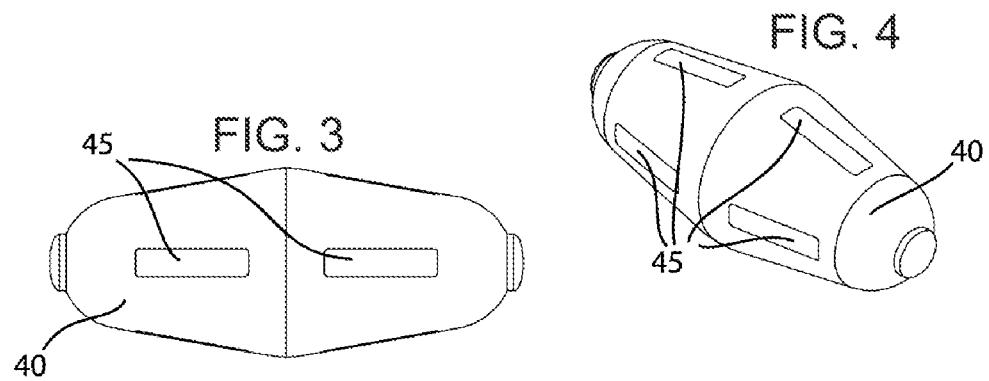
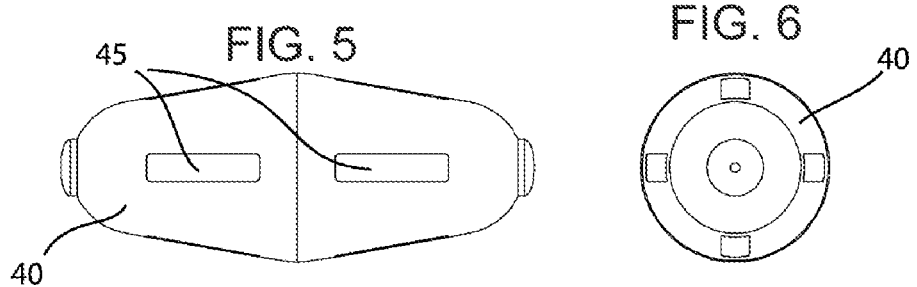
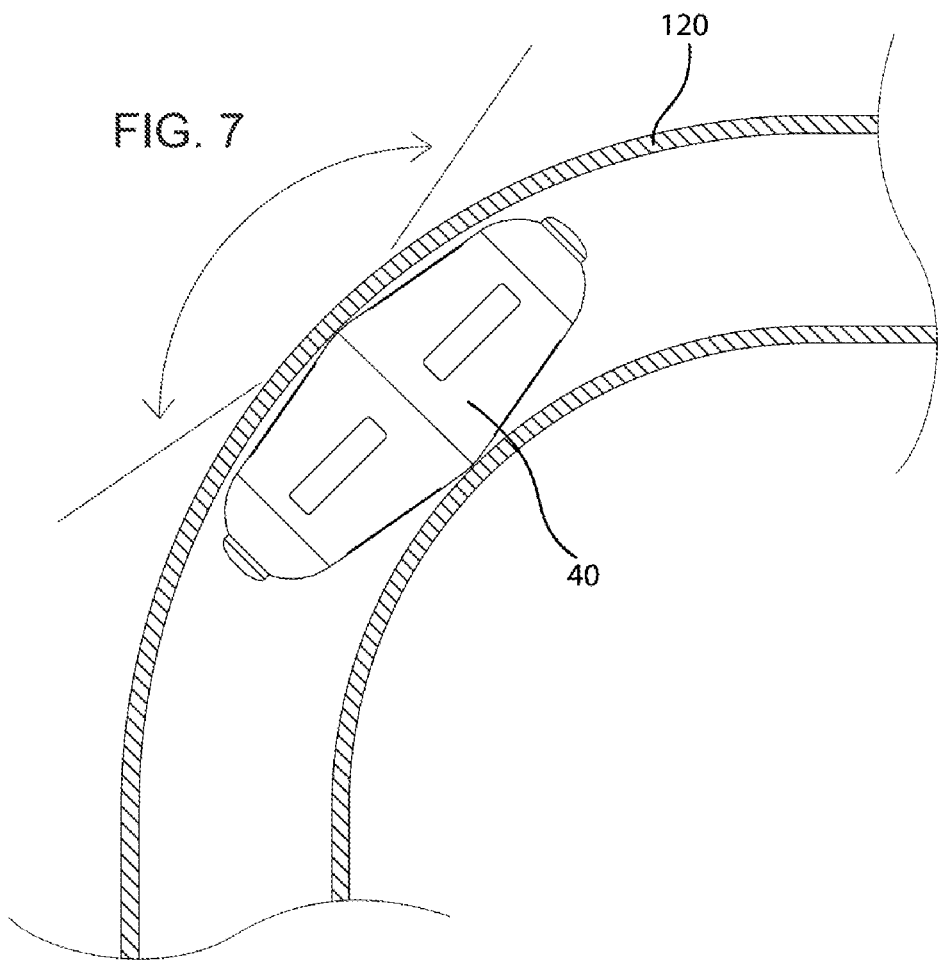

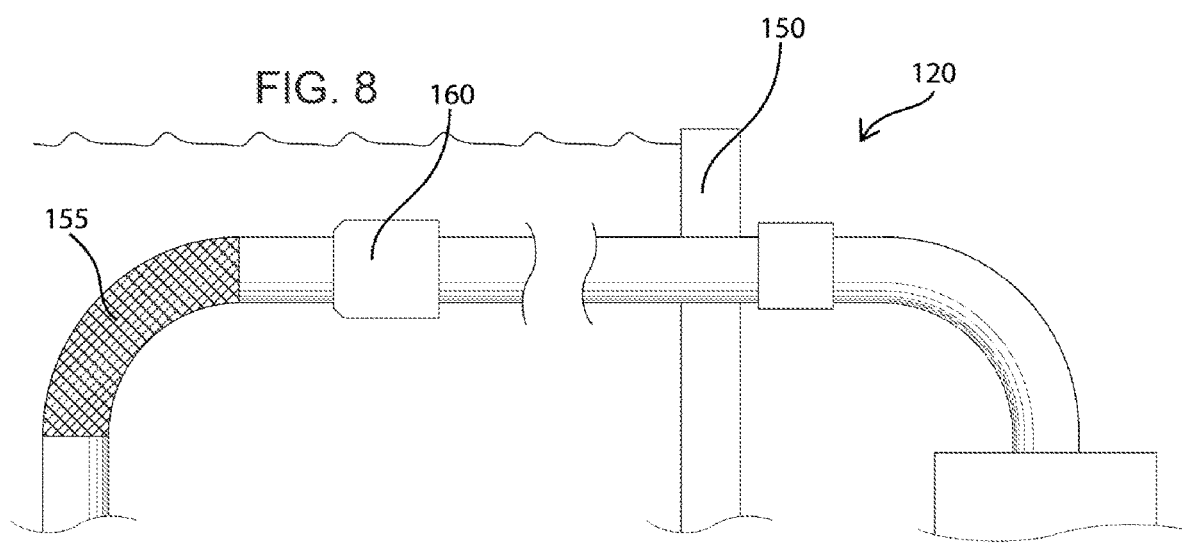
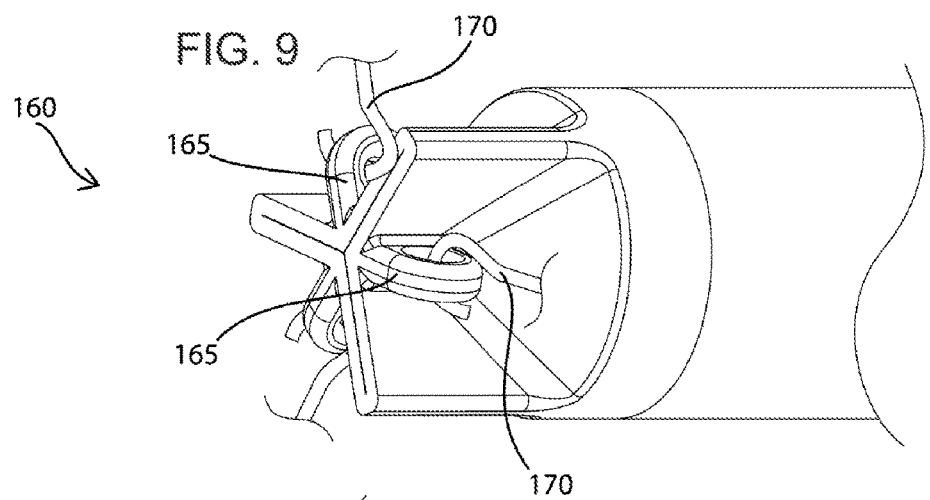
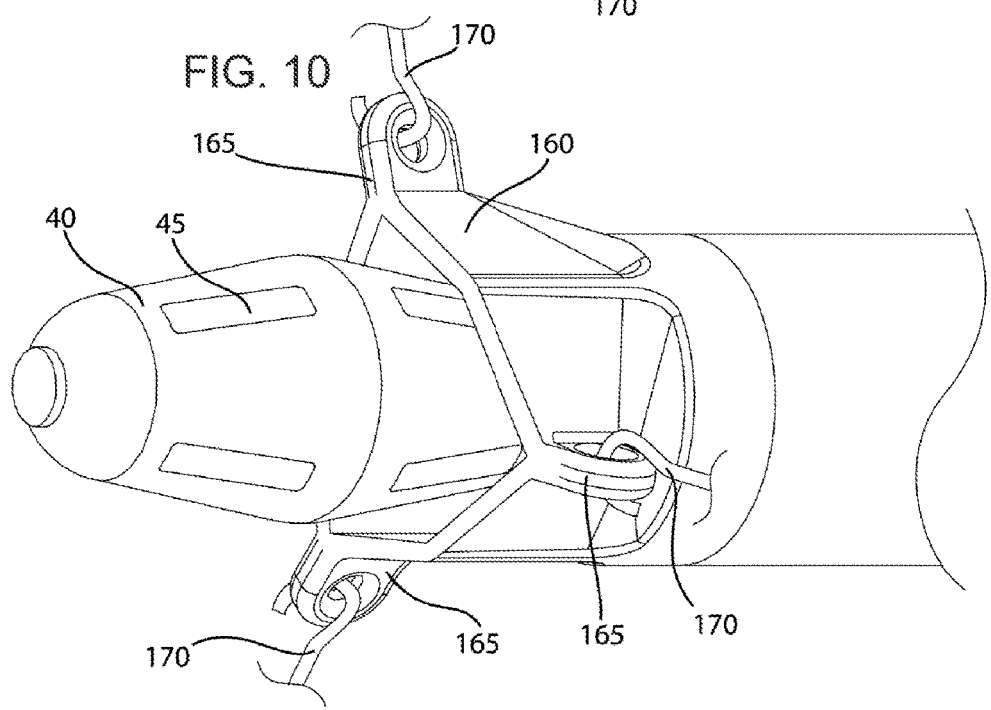

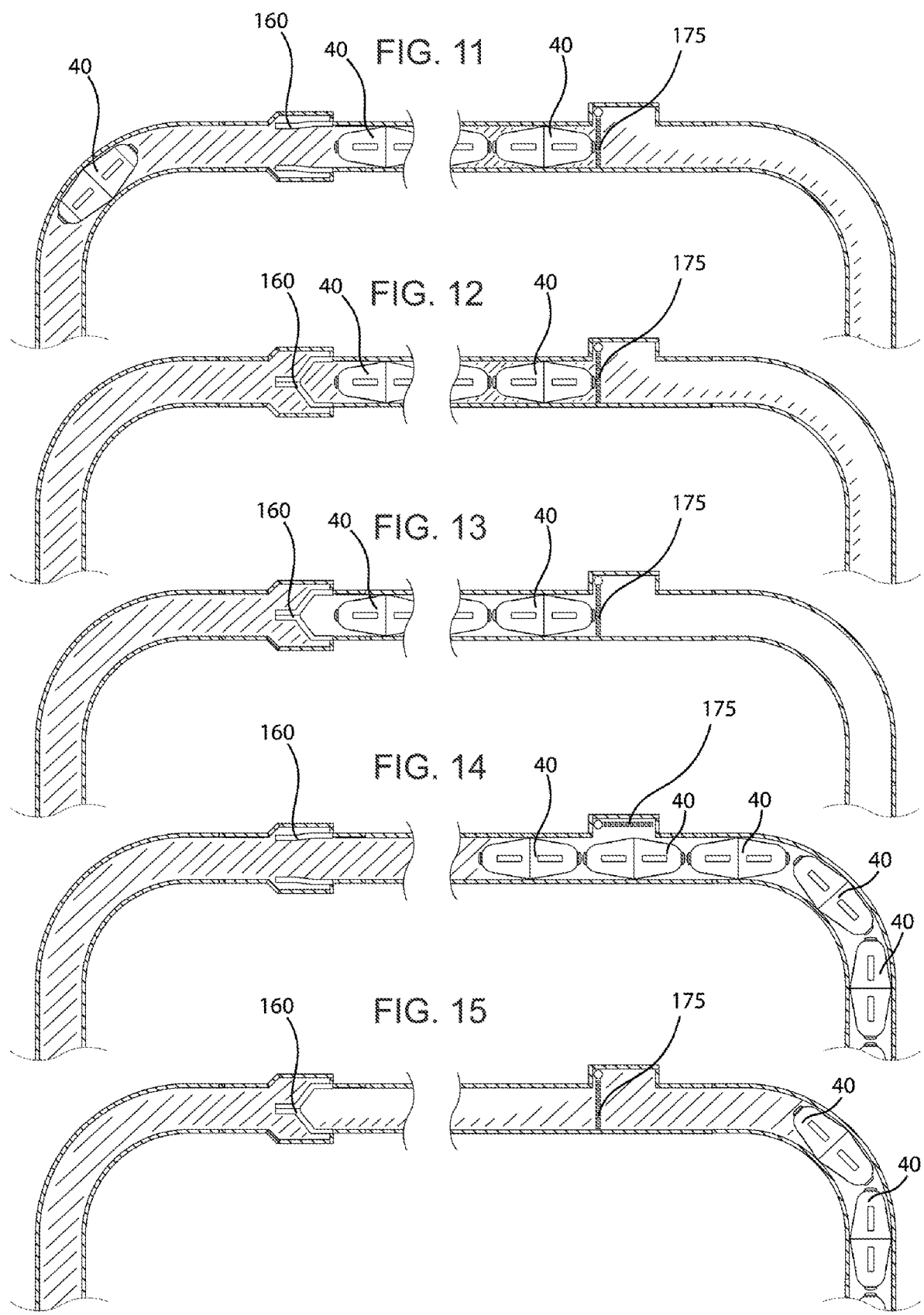

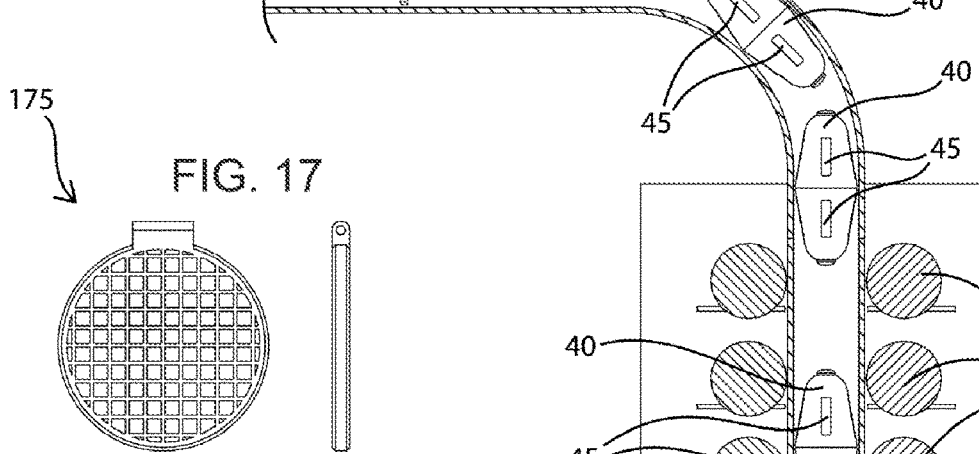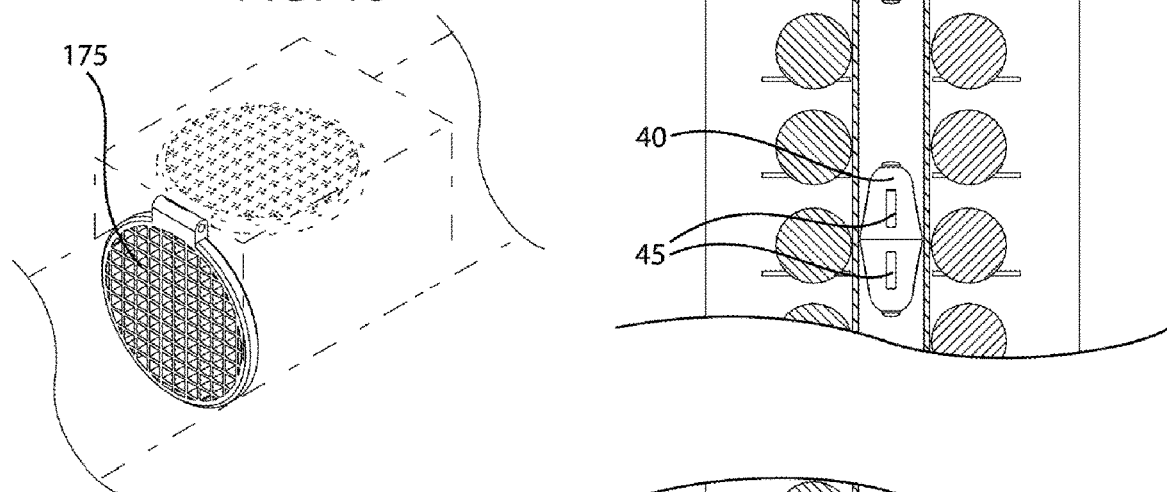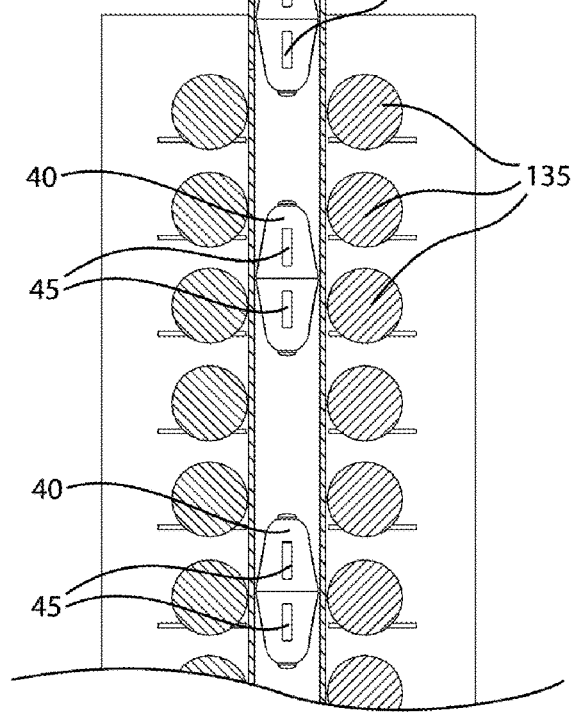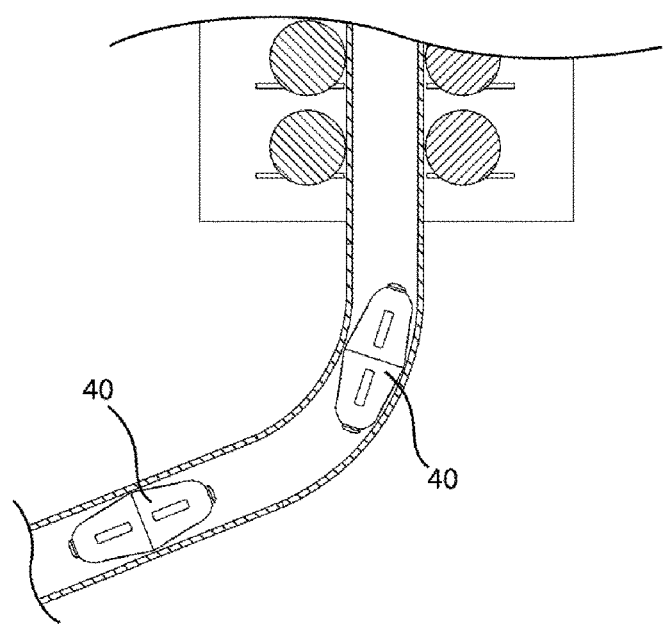

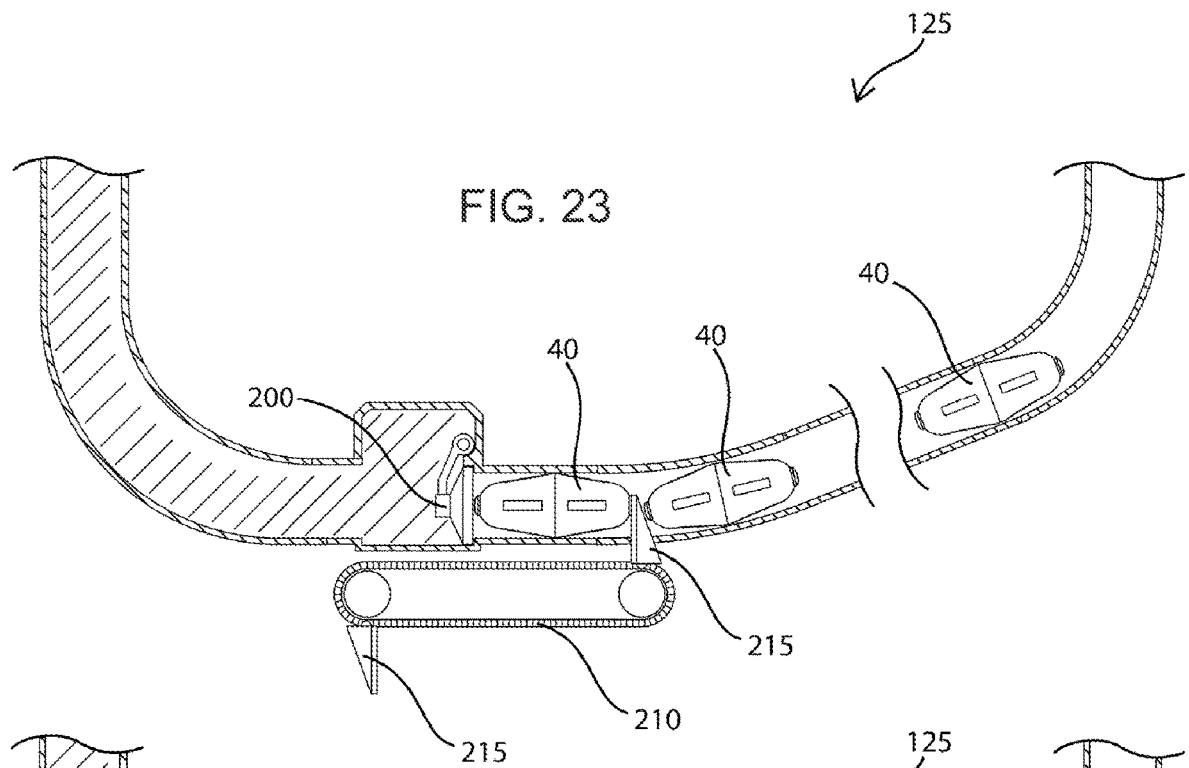
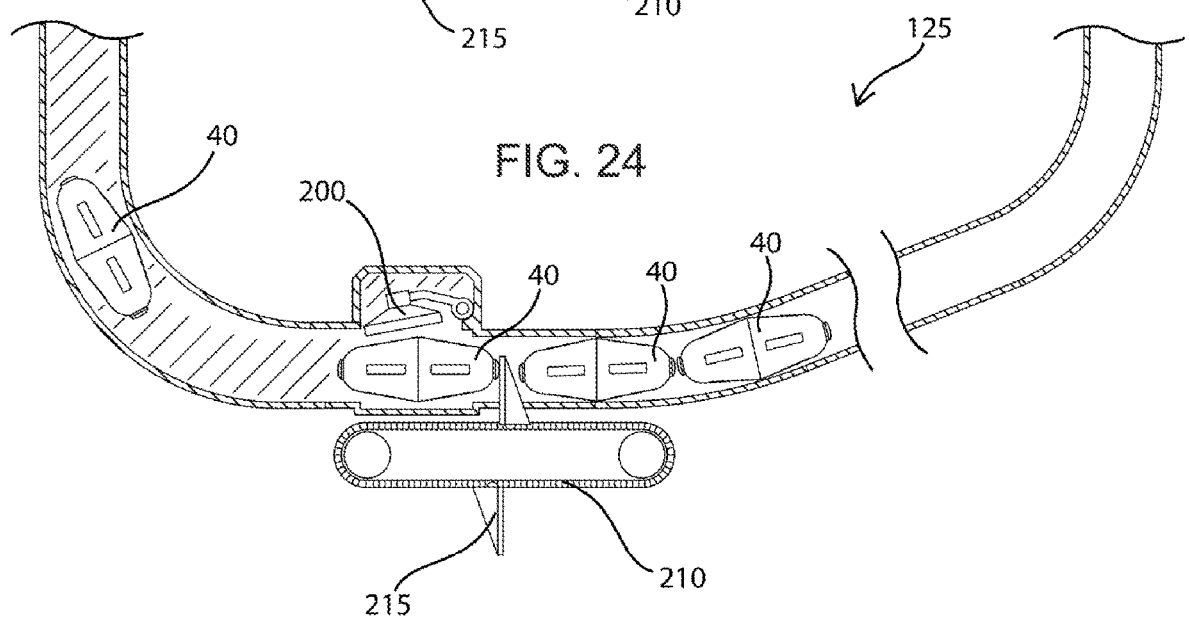

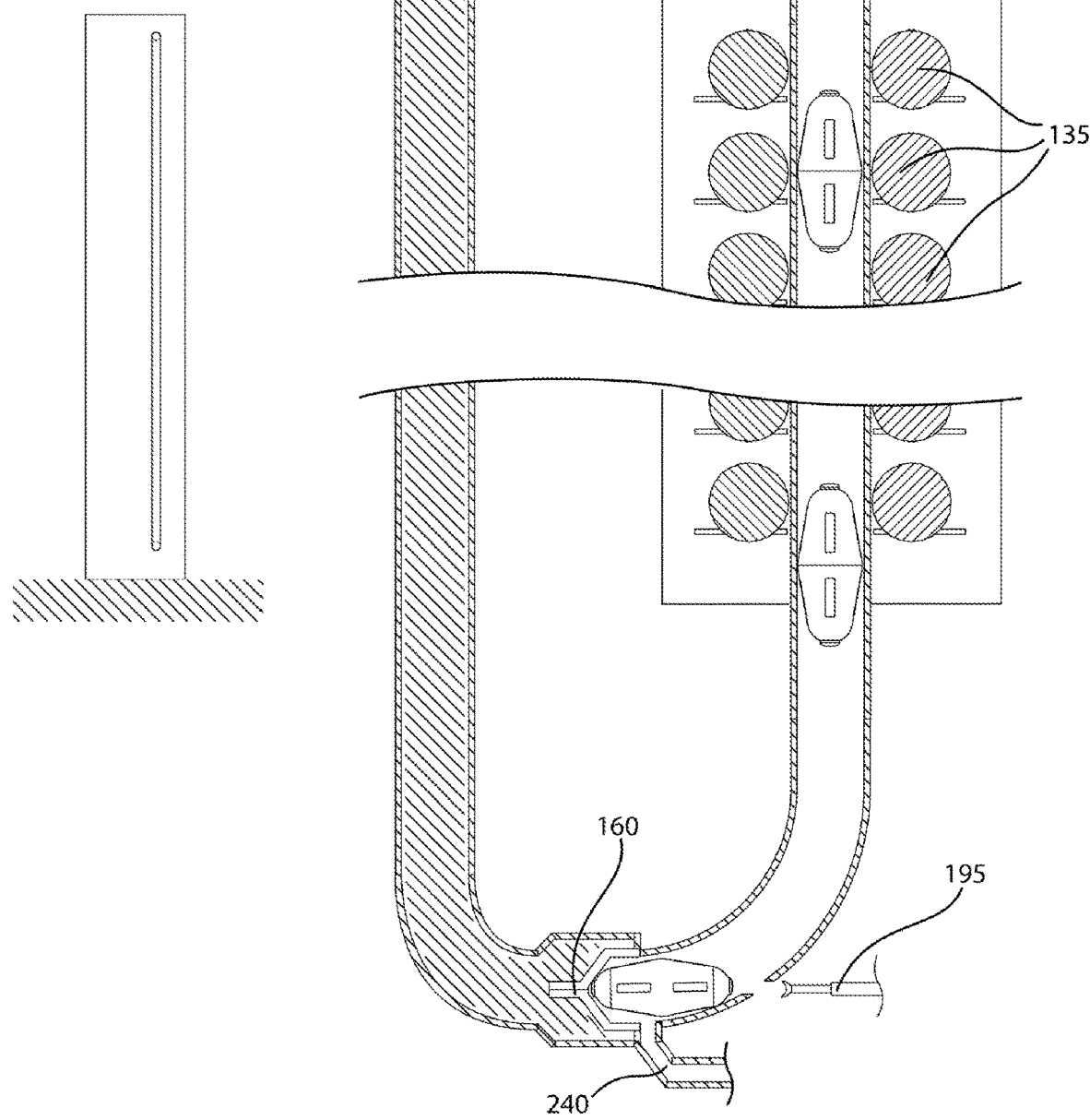

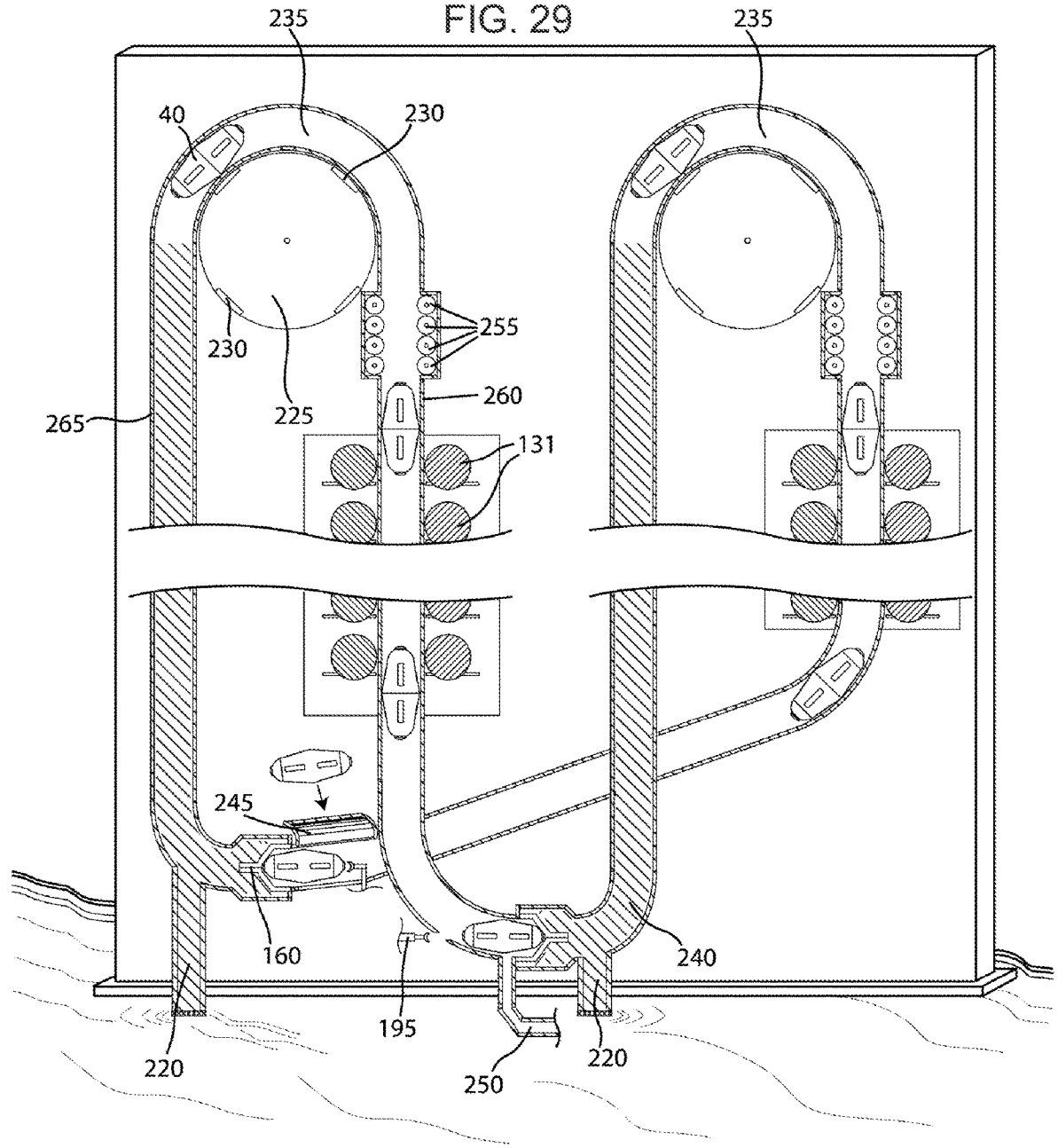

SYSTEMS AND METHODS FOR ELECTRICAL POWER GENERATION

CROSS-REFERENCE TO RELATED APPLICATIONS

This application is a continuation in part of U.S. application Ser. No. 16/945,784 entitled "Systems and Methods for Electrical Power Generation" to Evans et al., filed on Jul. 31, 2020.

BACKGROUND

1. Technical Field

Aspects of this document relate generally to systems and methods for generating electrical power.

2. Background Art

Solar, wind, and hydroelectric power generation are commonly known methods for producing clean energy. Traditional hydroelectric power plants are usually located on or near a water source. The volume of the water and the change in elevation determine the amount of energy in the moving water. At typical hydropower plants, water flows through a pipe and then pushes against and turns blades of a turbine to spin a generator to produce electricity.

SUMMARY

Implementations of an electrical power generation system may comprise a tube comprising a plurality of upper curves and a plurality of lower curves and forming a loop, the plurality of upper curves located at a higher vertical height than the plurality of lower curves and a plurality of electric generators external to the tube, each electric generator comprising a generator wheel having a magnet thereon, the plurality of electric generators positioned proximal to an external wall of the tube and electrically connected to a power grid. The system may comprise a plurality of buoyant torpedoes, each torpedo comprising a magnet configured to magnetically interact with the magnet on the wheel of the electric generator, the torpedoes configured to travel through the tube and turn the wheel of the electric generator in response to the magnetic interaction between the magnet on the torpedo and the magnet on the generator wheel and at least a portion of the plurality of lower curves of the tube may comprise a check valve.

Particular aspects may comprise one or more of the following features. At least a portion of the plurality of upper curves may comprise a wheel comprising a plurality of magnets external to the tube and within the upper curve, the plurality of magnets of the wheel external to the tube may be configured to magnetically interact with the magnet of the torpedo and move the torpedo through the upper curve in a direction of rotation of the wheel and into a vertical air shaft of the tube. The vertical air shaft of the tube may comprise a plurality of acceleration wheels configured to accelerate the torpedo as the torpedo falls through the vertical air shaft. The plurality of acceleration wheels may be positioned at a vertical height that his greater than a vertical height of the electric generator along a same vertical air shaft of the tube. The system may further comprise a liquid inlet proximal each upper curve of the loop and configured to fill a vertical liquid-filled shaft of the tube. The system may further comprise a liquid inlet proximal a lower curve of the tube.

The system may further comprise a drain proximal a lower curve of the tube, the drain configured to drain liquid from the vertical air shaft. The tube may further comprises an entry hatch configured to receive a torpedo into the tube. The plurality of buoyant torpedoes may be comprised of at least one of a metal and a metal alloy and are substantially hollow or substantially filled with a foam. At least a portion of the lower curves may further comprise a pusher piston configured to move a torpedo through the check valve.

Implementations of a method of generating electrical power may comprise providing a tube comprising a plurality of upper curves and a plurality of lower curves and forming a loop, the plurality of upper curves located at a higher vertical height than the plurality of lower curves and passing a plurality of buoyant torpedoes, each torpedo comprising a magnet, through a vertical air shaft of the tube and past a plurality of electric generators external to the tube. The method may further comprise spinning a wheel of an electric generator from among the plurality of electric generators when the magnet of the buoyant torpedo passes through a portion of the tube proximal the plurality of electric generators and magnetically interacts with a generator magnet on the wheel of the generator, passing the plurality of buoyant torpedoes through a check valve proximal a lower curve of the tube, and floating the plurality of buoyant torpedoes through a vertical liquid-filled portion of the tube using a liquid.

Particular aspects may comprise one or more of the following features. The method may further comprise moving the plurality of torpedoes through the upper curve by passing the torpedoes along a wheel comprising a plurality of magnets, the wheel external to the tube and within the upper curve, the plurality of magnets of the wheel external to the tube configured to magnetically interact with the magnet of the torpedo and move the torpedo through the upper curve of the loop in a direction of rotation of the wheel and into a vertical air shaft of the tube. The method may further comprise accelerating the plurality of torpedoes in a downward direction using a plurality of acceleration wheels configured to accelerate the torpedoes as the torpedoes falls through the vertical air shaft. The plurality of acceleration wheels may be positioned at a vertical height that his greater than a vertical height of the electric generator along a same vertical air shaft of the tube. The method may further comprise filling a vertical liquid-filled shaft of the tube via a liquid inlet proximal each upper curve of the loop and configured to fill a vertical liquid-filled shaft of the tube. The method may further comprise inputting liquid into the tube via a liquid inlet proximal a lower curve of the tube. The method may further comprise draining liquid from the vertical air shaft via a drain proximal a lower curve of the tube. The method may further comprise receiving a torpedo into the tube via an entry hatch in the tube. The plurality of buoyant torpedoes may be comprised of at least one of a metal and a metal alloy and are substantially hollow or substantially filled with a foam. The method may further comprise pushing the torpedo through the check valve using a pusher piston.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of post-AIA 35 U.S.C. § 112(f). Thus, the use of the words "function," "means" or "step" in the Description, Drawings, or Claims is not intended to somehow indicate a desire to invoke the special provisions of post-AIA 35 U.S.C. § 112(f), to define the invention. To the contrary, if the provisions of post-AIA 35 U.S.C. § 112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of post-AIA 35 U.S.C. § 112(f). Moreover, even if the provisions of post-AIA 35 U.S.C. § 112(f) are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 3-6 depict an implementation of a buoyant torpedo as used in an implementation of a system for electrical power generation.

FIG. 7 provides a cross-sectional view of a buoyant torpedo within a top portion of a tube forming a loop.

FIG. 8 depicts an implementation of a top portion of the tube forming the loop wherein at least a portion of the tube is comprised of a grate.

FIGS. 9-10 depict an implementation of a duckbill check valve.

FIGS. 11-15 depict a plurality of buoyant torpedoes passing through a top portion of the tube that forms a loop.

FIG. 16 depicts an implementation of a system for electrical power generation comprising a plurality of electric generators external the tube.

FIGS. 17-18 depict an implementation of a grate within a top portion of the tube.

FIGS. 23-24 depict an implementation of a bottom portion of the tube comprising a check valve and an open track with a conveyor and pusher.

FIGS. 25-26 depicts an implementation of a system for electrical power generation for use in a building.

FIG. 29 depicts an implementation of an electrical power generation system comprising a plurality of accelerator wheels.

DESCRIPTION

This disclosure, its aspects and implementations, are not limited to the specific components or methods disclosed herein. Many additional components and assembly procedures known in the art consistent with the intended electrical power generation systems and related methods will become apparent for use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

The present disclosure relates to systems and methods for utilization of a plurality of buoyant torpedoes to generate electrical power as the torpedoes travel through a tube forming a loop.

Figure 1:
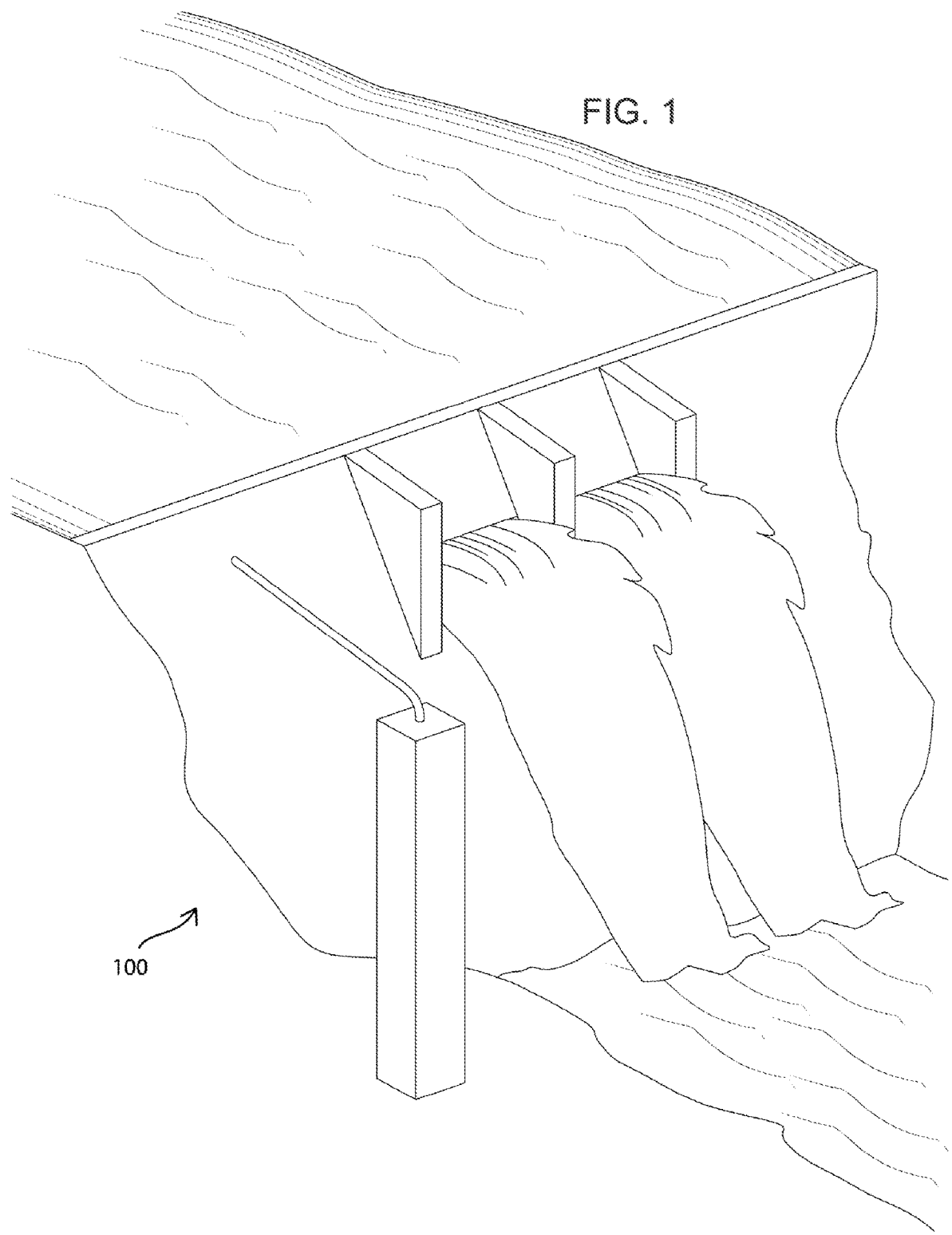
FIGS. 1-2 provide perspective views of a system for electrical power generation used in conjunction with a dam.
Figure 2:
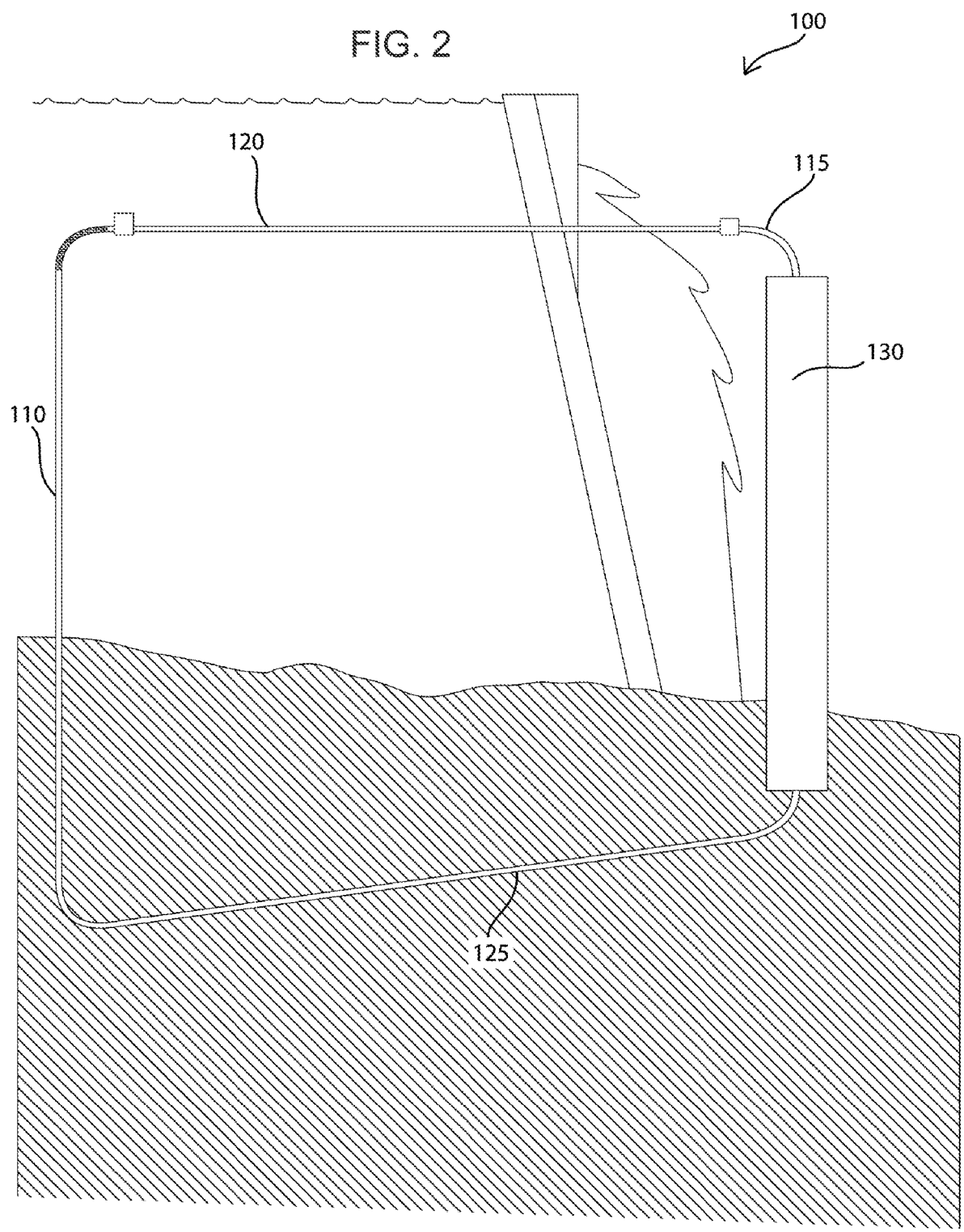

FIGS. 1-2 show an implementation of an electrical power generation system 100 for use in conjunction with an existing or newly built dam. As shown, the system comprises a tube 110 forming a loop 115 comprising a top portion of the loop 120 and a bottom portion of the loop 125. In some embodiments, the bottom portion of the loop 125 may be at least partially buried. The loop further comprises a vertical shaft 130 configured to house a plurality of electric generators 135 therein such that the plurality of electric generators 135 is external to the tube 110.

A plurality of buoyant torpedoes 40 as depicted in FIGS. 3-7 is configured to fit within the tube 110 and travel throughout the loop 115. Each torpedo may comprise one or more magnets 45 and may be comprised of any durable material such as for example, a metal or a metal alloy. The torpedoes 40 may either be hollow or may be filled with a foam or other material having a density of less than 997 kg per cubic meter such that the plurality of torpedoes 40 is buoyant in water. The torpedoes 40 may be comprised of a single torpedo body or may be comprised of multiple body components comprising threads or other attachment mechanisms to couple the body components of the torpedoes together. The torpedoes 40 may further comprise a bumper or other stopper to minimize impact to the torpedoes 40 at the bottom of the loop 115. As illustrated in FIG. 7, the sides of the torpedoes 40 are angled to a degree that is less than 180 degrees relative to a longitudinal axis if the torpedo 40. This shape permits the torpedo 40 to pass through a bend in the tube 110 while still creating a seal between the torpedo and internal wall of the tube to prevent or minimize water flow past the torpedo 40. As also illustrated by the angle indicated in FIG. 7, the smaller the indicated angle equates to a tighter radius of the loop 115 that the torpedo 40 moves through.

FIG. 8 depicts a top portion 120 of an implementation of the loop 115. As shown, a portion of the loop that is located under the surface of the water and behind a dam 150 may comprise a grate 155 that allow water to enter the tube 110. The top portion 120 of the loop 115 may comprise one or more check valves 160. An exemplary embodiment of one implementation of a check valve 160 is provided in FIGS. 9-10. While any appropriate check valve 160 may be used, in this implementation, the check valve 160 may comprise a check valve 160 comprised of a rubber or other flexible material comprising a plurality of rings 165 that is pulled open by one or more hooks 170 coupled to each ring 165 to allow one or more torpedoes 40 to pass therethrough. After one or more torpedoes 40 passes through the check valve, the system may then allow the check valve 160 to close and the water pressure behind the check valve 160 serves to tighten the seal.

FIGS. 11-15 provide an exemplary illustration of how the torpedoes 40 travel through the top portion 120 of the loop 115. In these drawings, it should be noted that the diagonal lines are intended to indicate the presence of water within the tube 110. As shown in FIG. 11, the buoyant torpedoes 40 float upward in the water-filled portion of the tube and then traverse the top portion of the loop 115 by passing through an open check valve 160 and being prevented from moving past the top portion 120 of the loop by a grate 175 within the tube 110 that allows water within the tube to continue passing through the top portion 120 and make its way to the bottom portion 125 of the loop where it can exit the tube via one or more drainage holes or other openings that direct the water into the river or other body of water below the dam 150.

As shown in FIG. 12, once a desired number of torpedoes 40 pass through the check valve 160, the check valve 160 closes while the torpedoes are held in place by the grate 175. As shown in FIG. 13, this allows all of the water to drain out of the top portion 120 of the loop 115 creating an air shaft for the torpedoes 40 to travel through on their way to the bottom portion 125 of the loop 115. As shown in FIG. 14, the grate 175 then moves to a position in which the grate 175 is not obstructing the flow of torpedoes 40 through the tube 110 and the check valve 160 is opened to allow water to push the plurality of torpedoes 40 forward through the top portion 120 of the loop 115 and into the air shaft. The check valve 160 and grate 175 then return to the closed position and the remaining downstream water in the tube 110 drains out of the tube 110. FIGS. 17-18 provide illustrations of in exemplary embodiment of a grate 175.

Figure 19:
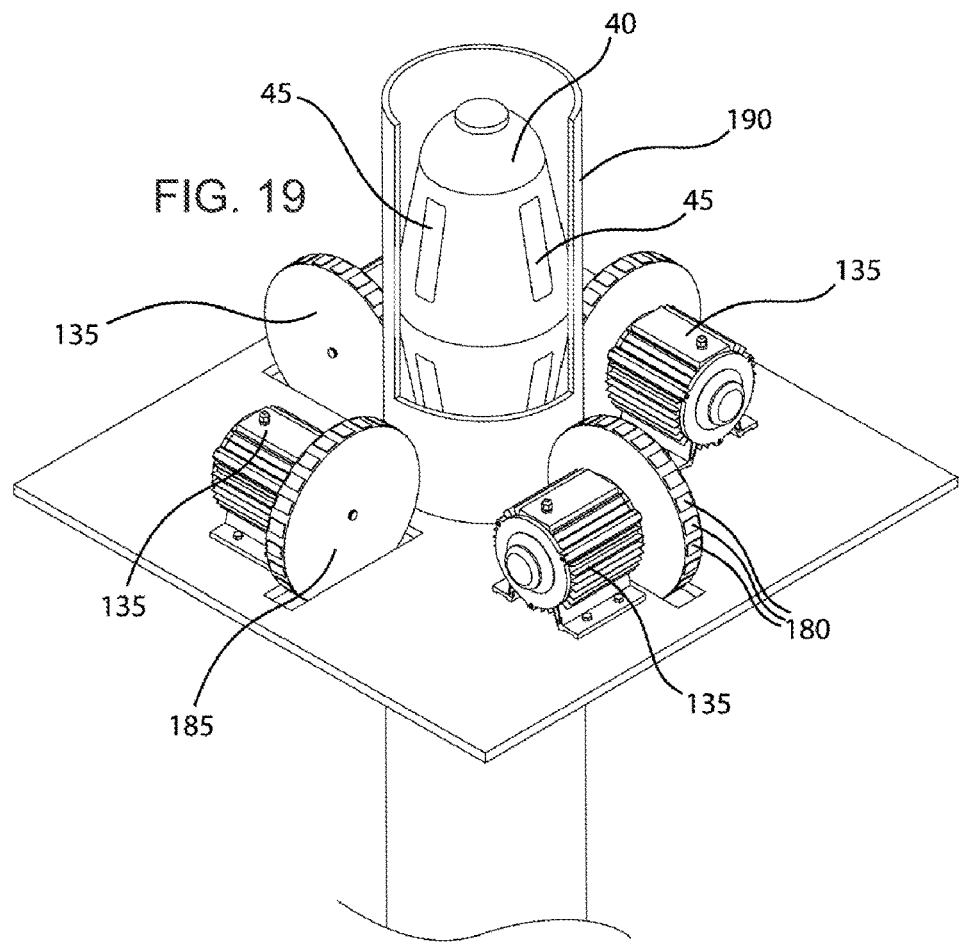
FIGS. 19-20 depict an implementation of a plurality of electric generators each comprising wheel comprising a magnet.
Figure 20:
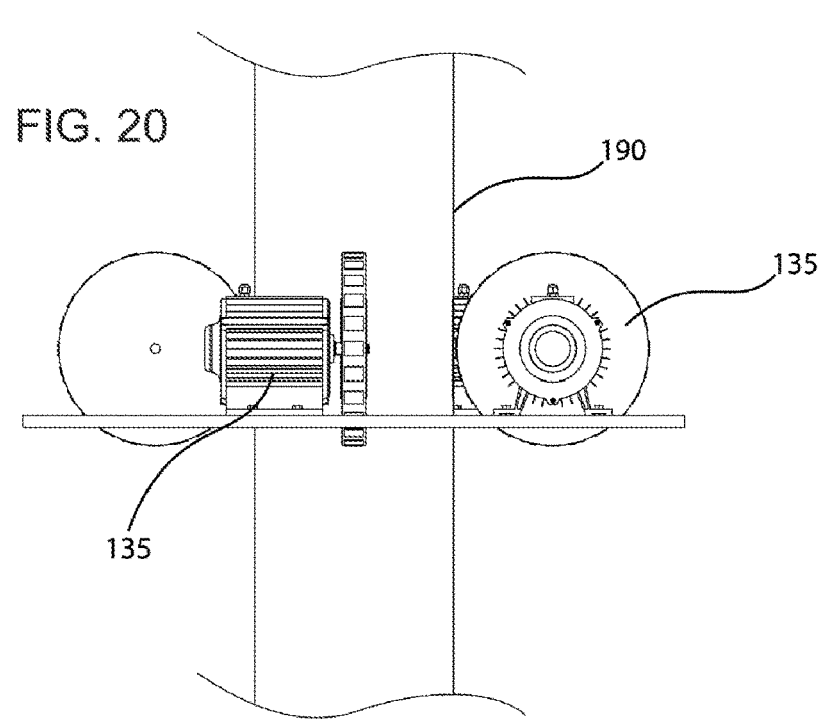

As shown in FIG. 16, the torpedoes 40 continue to fall vertically through the air shaft of the loop 115 and pass by a plurality of electrical generators 135 that are external to the tube 110 but are proximal the external wall 190 of the tube. As the torpedoes 40 pass by the electric generators 135, the magnetic force of one or more magnets 45 on the torpedoes 40 acts on one or more magnets 180 of a wheel 185 of the electric generators 135 and turns the wheel 185 to generate electricity. A cutaway view of a torpedo 40 passing through the tube 110 with the electric generators 135 proximal to the external surface 190 of the tube 110 is shown in FIGS. 19-20. The one or more electric generators 135 are also electrically connected to a power grid.

Figure 21:
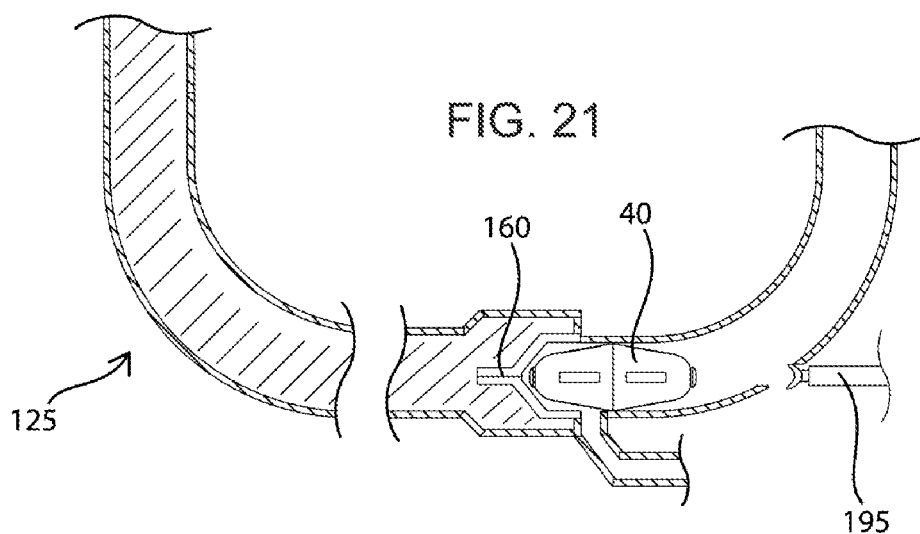
FIGS. 21-22 depict an implementation of a bottom portion of the tube comprising a check valve and a pusher piston.
Figure 22:
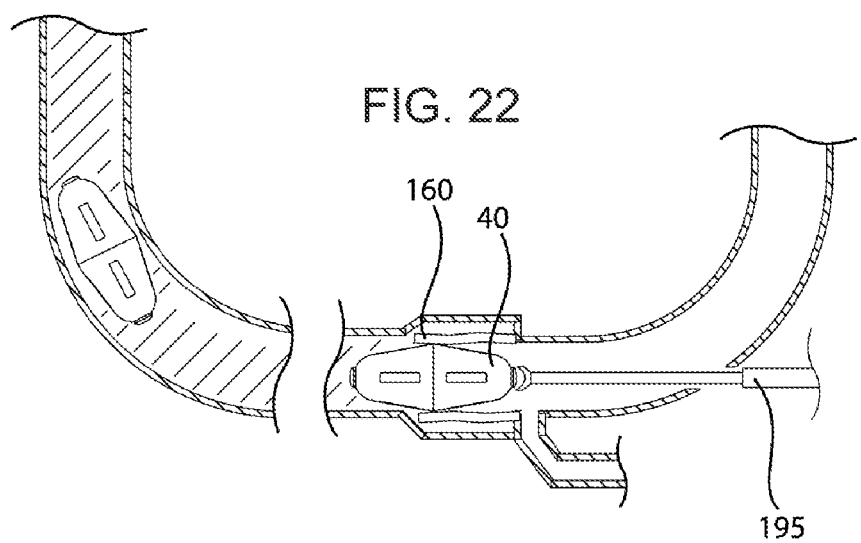

FIGS. 21-22 depict an exemplary embodiment of a bottom portion 125 of the loop 115. As shown, when a torpedo 40 reaches the bottom portion 125 of the loop, the torpedo encounters a second check valve 160 that is in a closed position. When the check valve 160 is opened, the water which has filled the upstream portion of the loop 115 via the grate 155 of the top portion 120 of the loop 115 exerts a force on the torpedo 40. In order to move the torpedo 40 so that it may pass through to the upstream vertical portion of the loop where its buoyancy will allow it to float to the top portion 120 of the loop 115, the system exerts a mechanical force on the torpedo 40 using a pusher piston 195.

Alternatively, as shown in FIGS. 23-24, the check valve 160 at the bottom portion 125 of the loop may comprise a door 200 coupled to a lever that opens when a force is exerted in an upstream direction. In this embodiment, the bottom portion 125 of the tube 115 comprises an open track with a conveyer belt 210 located external to the tube 115. The conveyor belt 210 further comprises one or more pushers 215 that extend through the open track into the tube 110 which physically push the torpedoes 40 against the door 200 which opens and then advance the torpedoes 40 against the water pressure to the upstream vertical portion of the tube 110 so the torpedoes 40 may float to the surface and complete the loop 115.

FIGS. 25-26 depict an embodiment of an electric power generation system that may be installed in a building such as by non-limiting example, a skyscraper. Water enters the loop 115 via a water inlet 220 that is in fluid communication with a plumbing system of the building. As the torpedoes 40 travel through the loop 115, when they reach the top portion 120 of the loop 115 that is above the water inlet 220, one or more magnets 45 on the torpedoes 40 interact with one or more magnets 230 positioned around a wheel 225 that is external to the loop 115 and which thereby moves the torpedoes 40 through the top portion 120 of the loop and to the vertical portion of the loop along which the electric generators 135 are externally located so that the torpedoes 40 may free fall down this portion of the loop 115 which is filled with air.

Figure 27:
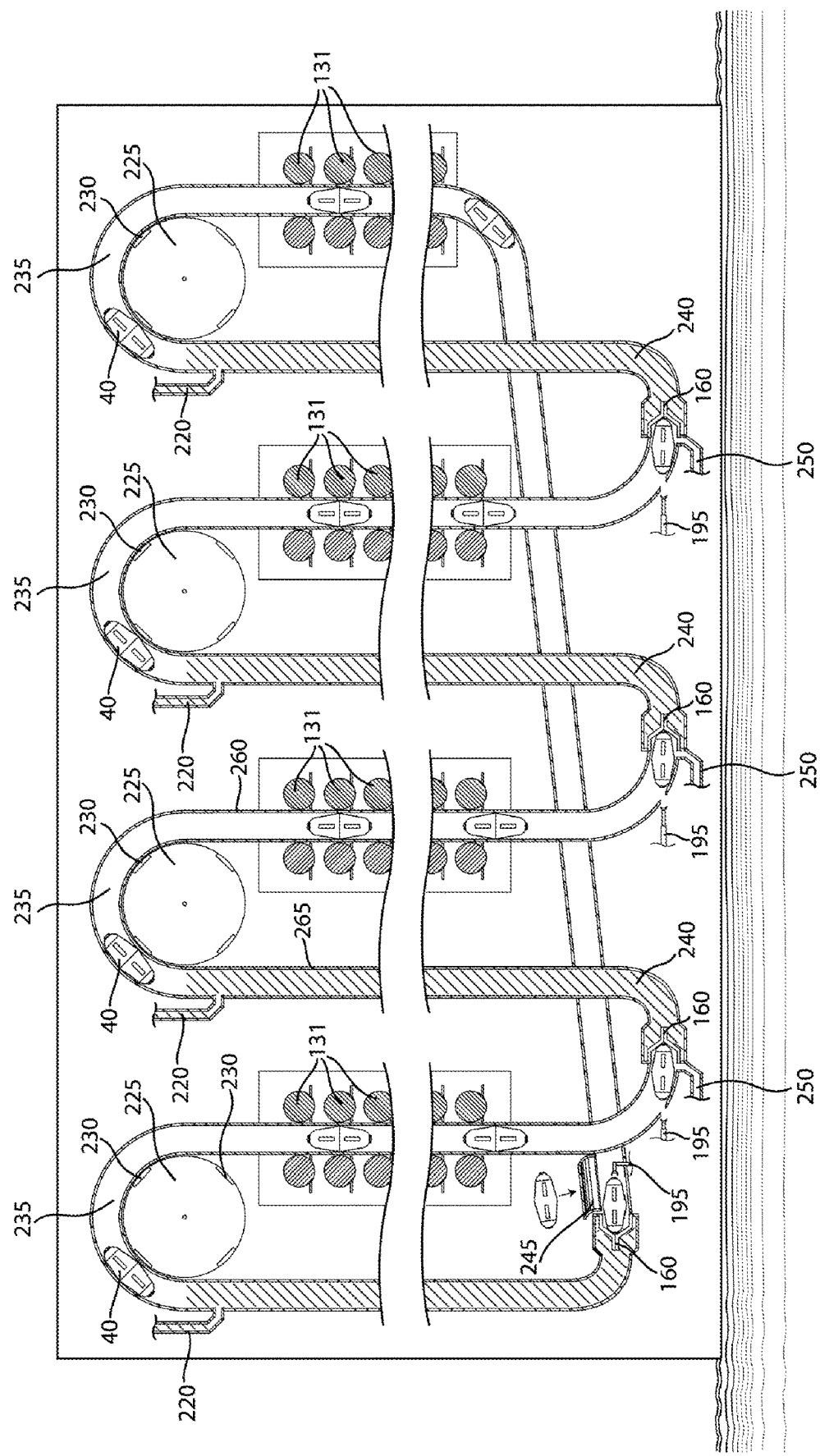
FIG. 27 depicts an implementation of a system for electrical power generation comprising a plurality of upper and lower curves within a loop.

FIG. 27 depicts and embodiment of an electric power generation system comprising a tube 110 configured in a plurality of upper curves 235 and lower curves 240 such that the tube 110 forms a continuous loop 115. In some implementations, the tube 110 may comprise an entry hatch 245 configured to allow torpedoes 40 to be added or removed from within the tube 110. The entry hatch 245 may comprise a hinged, locking, or sliding door in a portion of the tube 110 to allow for torpedo 40 insertion and removal. A liquid inlet 220 may be positioned proximal one or more of the upper curves 235 of the tube 110 such that a liquid-filled vertical shaft 265 is formed when liquid flows into the vertical shaft 265 via the liquid inlet 220. The liquid-filled vertical shaft 265 is separated from a vertical air shaft 260 by a check valve 160 located proximal a lower curve 240 of the tube 110. This check valve 160 remains in a closed position until a torpedo 40 is ready to pass from a vertical air shaft 260 of the tube 110 and into a vertical liquid-filled shaft 265 so that the torpedo 40 may float up the vertical liquid-filled shaft 265 to the upper curve 235 of the tube 110. Once the torpedo 40 reaches the upper curve 235 of the tube 110, one or more magnets on the torpedo 40 magnetically interact with one or more magnets 230 of a wheel 225 external to and within the upper curve 235 which moves the torpedo 40 through the upper curve 235 of the tube 110 in a direction of rotation of the external wheel 225. When the external wheel 225 turns sufficiently that the magnet 230 of the external wheel 225 is no longer magnetically engaged with the magnet 45 of the torpedo 40, the torpedo 40 falls through the vertical air shaft 260. As the torpedo 40 falls through the vertical air shaft 260, the one or more magnets 45 of the torpedo 40 magnetically interact with one or more magnets 180 on the wheel 185 of each of a plurality of electric generators 131, thereby generating an electric current. Each vertical air shaft 260 is in fluid communication with a vertical liquid-filled shaft 265 at the lower curve 240 and such a configuration may comprise any number of a plurality of upper 235 and lower curves 240 in fluid communication with one another. A drain 250 may be located proximal one or more of the lower curves 240 of the tube such that excess liquid that passes through the check valve 160 is drained away. In some implementations, a pusher piston 195 may be used to push the torpedo 40 through the check valve 160.

Figure 28:
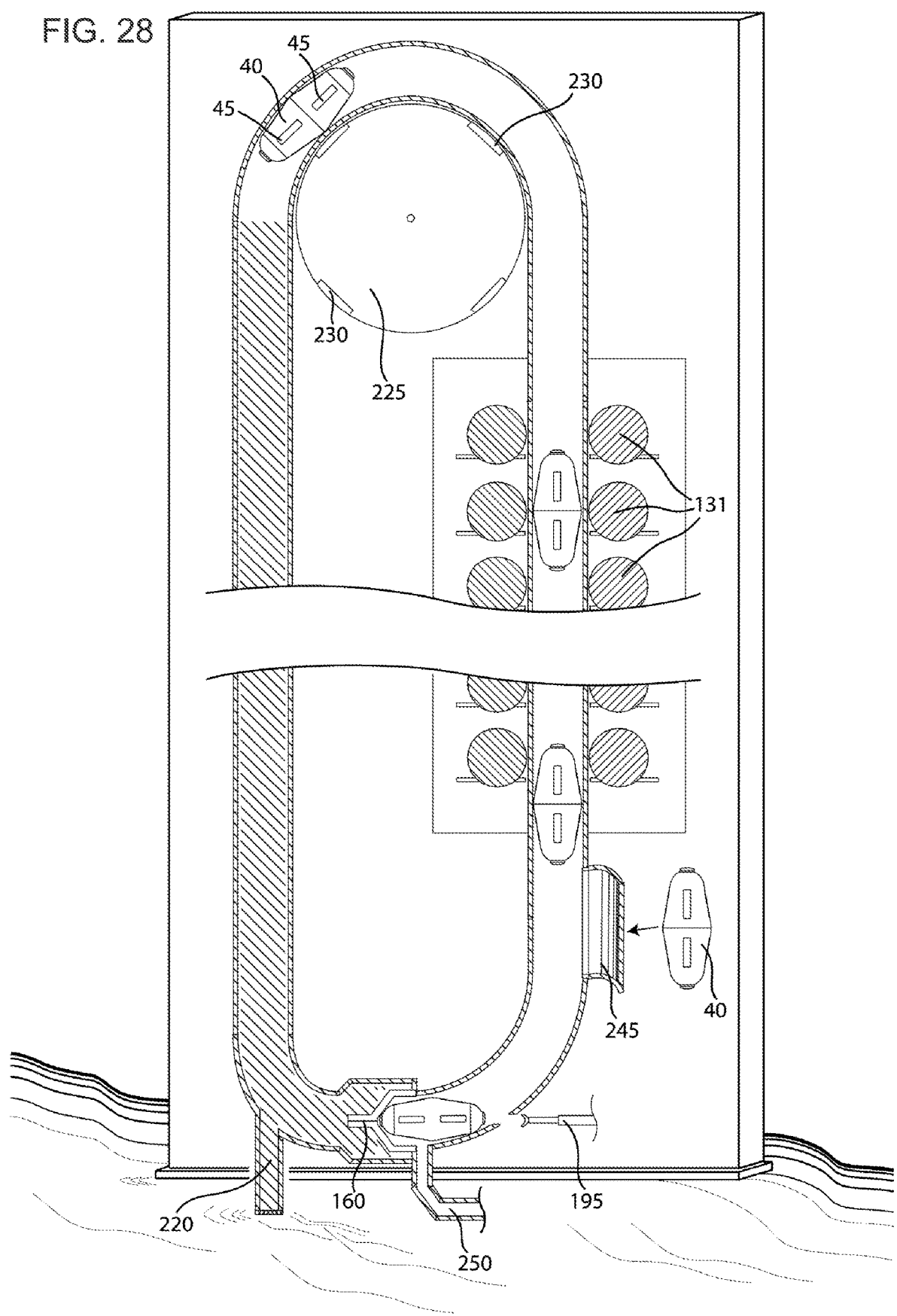
FIG. 28 depicts an implementation of an electrical power generation system for use near a flowing body of water.

FIGS. 28-29 depict embodiments of an electric power generation system that may be located near a river or other flowing body of a liquid such as water. As shown, an inlet 220 may be positioned proximal one or more lower curves 240 of the tube 110 in fluid communication with a vertical liquid-filled shaft 265 of the tube 110. To fill the vertical liquid-filled shaft 265, a pump (not shown) may be used to maintain the liquid at a level that approaches the upper curve 235 of the tube 110. In some embodiments, as shown in FIG. 29, the vertical air shaft 260 may comprise a plurality of acceleration wheels 255 located above the plurality of electric generators 131 which may speed the rate of descent of the torpedo 40 past the electric generators 131 thereby increasing the production of electrical current.

It will be understood that embodiments and implementations described and illustrated herein are not limited to the specific components disclosed herein, as virtually any components consistent with the intended operation of a method and/or system implementation for electrical power generation may be utilized. In places where the description above refers to particular embodiments of an electrical power system and generation techniques, it should be readily apparent that a number of modifications may be made without departing from the spirit thereof and that these implementations may be applied to other such systems and components. The presently disclosed implementations are, therefore, to be considered in all respects as illustrative and not restrictive.

The implementations listed here, and many others, will become readily apparent from this disclosure. From this, those of ordinary skill in the art will readily understand the versatility with which this disclosure may be applied.

We claim:

1. An electrical power generation system comprising:
    a tube comprising a plurality of upper curves and a plurality of lower curves and forming a loop, the plurality of upper curves located at a higher vertical height than the plurality of lower curves;
    a plurality of electric generators external to the tube, each electric generator comprising a generator wheel having a magnet thereon, the plurality of electric generators positioned proximal to an external wall of the tube and electrically connected to a power grid; and
    a plurality of buoyant torpedoes, each torpedo comprising a magnet configured to magnetically interact with the magnet on the wheel of the electric generator, the torpedoes configured to travel through the tube and turn the wheel of the electric generator in response to the magnetic interaction between the magnet on the torpedo and the magnet on the generator wheel; and
    wherein at least a portion of the plurality of lower curves of the tube comprises a check valve.

2. The electrical power generation system of claim 1, wherein at least a portion of the plurality of upper curves comprises a wheel comprising a plurality of magnets external to the tube and within the upper curve, the plurality of magnets of the wheel external to the tube configured to magnetically interact with the magnet of the torpedo and move the torpedo through the upper curve in a direction of rotation of the wheel and into a vertical air shaft of the tube.

3. The electrical power generation system of claim 2, wherein the vertical air shaft of the tube comprises a plurality of acceleration wheels configured to accelerate the torpedo as the torpedo falls through the vertical air shaft.

4. The electrical power generation system of claim 3, wherein the plurality of acceleration wheels is positioned at a vertical height that is greater than a vertical height of the electric generator along a same vertical air shaft of the tube.

5. The electrical power generation system of claim 2, further comprising a drain proximal a lower curve of the tube, the drain configured to drain liquid from the vertical air shaft of the tube.

6. The electrical power generation system of claim 1, further comprising a liquid inlet proximal each upper curve of the loop and configured to fill a vertical liquid-filled shaft of the tube.

7. The electrical power generation system of claim 1, further comprising a liquid inlet proximal a lower curve of the tube.

8. The electrical power generation system of claim 1, wherein the tube further comprises an entry hatch configured to receive a torpedo into the tube.

9. The electrical power generation system of claim 1, wherein the plurality of buoyant torpedoes is comprised of at least one of a metal and a metal alloy and are substantially hollow or substantially filled with a foam.

10. The electrical power generation system of claim 1, wherein at least a portion of the lower curves further comprise a pusher piston configured to move a torpedo through the check valve.

11. A method of generating electrical power comprising:
    providing a tube comprising a plurality of upper curves and a plurality of lower curves and forming a loop, the plurality of upper curves located at a higher vertical height than the plurality of lower curves;
    passing a plurality of buoyant torpedoes, each torpedo comprising a magnet, through a vertical air shaft of the tube and past a plurality of electric generators external to the tube;
    spinning a wheel of an electric generator from among the plurality of electric generators when the magnet of the buoyant torpedo passes through a portion of the tube proximal the plurality of electric generators and magnetically interacts with a generator magnet on the wheel of the generator;
    passing the plurality of buoyant torpedoes through a check valve proximal a lower curve of the tube; and
    floating the plurality of buoyant torpedoes through a vertical liquid-filled portion of the tube using a liquid.

12. The method of claim 11, further comprising moving the plurality of torpedoes through the upper curve by passing the torpedoes along a wheel comprising a plurality of magnets, the wheel external to the tube and within the upper curve, the plurality of magnets of the wheel external to the tube configured to magnetically interact with the magnet of the torpedo and move the torpedo through the upper curve of the loop in a direction of rotation of the wheel and into the vertical air shaft of the tube.

13. The method of claim 11, further comprising accelerating the plurality of torpedoes in a downward direction using a plurality of acceleration wheels configured to accelerate the torpedoes as the torpedoes falls through the vertical air shaft.

14. The method of claim 13, wherein the plurality of acceleration wheels is positioned at a vertical height that is greater than a vertical height of the electric generator along a same vertical air shaft of the tube.

15. The method of claim 11, further comprising filling a vertical liquid-filled shaft of the tube via a liquid inlet proximal each upper curve of the loop and configured to fill a vertical liquid-filled shaft of the tube.

16. The method of claim 11, further comprising inputting liquid into the tube via a liquid inlet proximal a lower curve of the tube.

17. The method of claim 11, further comprising draining liquid from the vertical air shaft via a drain proximal a lower curve of the tube.

18. The method of claim 11, further comprising receiving a torpedo into the tube via an entry hatch in the tube.

19. The method of claim 11, wherein the plurality of buoyant torpedoes is comprised of at least one of a metal and a metal alloy and are substantially hollow or substantially filled with a foam.

20. The method of claim 11, further comprising pushing the torpedo through the check valve using a pusher piston.

* * * * *